Jan. 17, 1956   G. J. GLASS ET AL   2,730,759
RECLAIM PROCESSING APPARATUS
Filed March 3, 1953
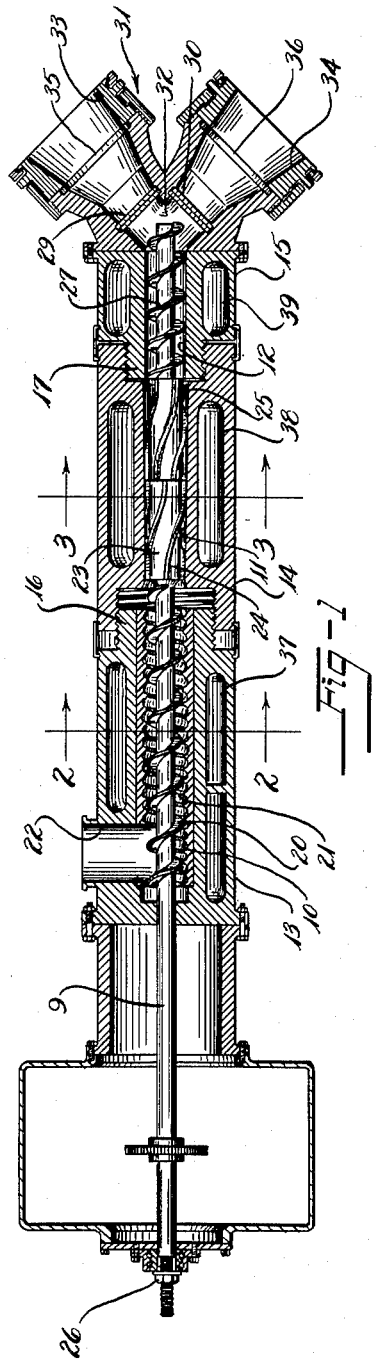
Inventors
George L. Bruggemeier
George J. Glass
By W. A. Fraser
Atty.

A substantial length of the shaft 9 extends rearwardly from the housing 1 and is connected to conventional support and drive means, not shown, which rotates the shaft.

2,730,759

RECLAIM PROCESSING APPARATUS

George J. Glass, Poland, and George L. Bruggemeier, Akron, Ohio, assignors to The Firestone Tire & Rubber Company, Akron, Ohio, a corporation of Ohio Application March 3, 1953, Serial No. 346,118

7 Claims. (Cl. 18—12)

This invention relates to the processing of rubbery material and particularly to the processing of reclaimed rubber subsequent to the devulcanization operation.

Reclaim rubber is a product prepared from ground-up scrap of worn tires and the like. The reclaiming operation consists in removing the cellulose material from the rubber scrap, devulcanizing the scrap and finally processing the final product so that it may be used in the compounding of rubber stocks for the manufacture of new tires or other rubber products.

In this final processing step the reclaim is usually worked in a two-roll mill until it is soft and plastic and is then conveyed to a second refining mill for the initial refining operation. Following the refining operation the reclaim is strained, to remove foreign material and dirt, by forcing the reclaim through a fine mesh screen. The reclaim is then ready for a final milling operation which prepares the reclaim for final use as a compounding ingredient for the manufacture of new rubber articles.

These operations of mill massing, refining and straining are batch operations. In moving from one operation to the next the reclaim loses appreciable amounts of heat and additional power is required in each subsequent operation to rework the cooled reclaim. Furthermore the equipment for massing, refining, and straining is large, expensive and requires excessive floor space. These are real disadvantages.

The present invention overcomes these disadvantages by providing a single piece of equipment which will mass, refine, and strain the reclaim in a single operation. This is done by means of an extrusion machine which forces the rubber forwardly in the bore of the machine while working the rubber between successive working surfaces on both the extrusion shaft and the extrusion bore. This working is accomplished under controlled temperature conditions.

A primary object of the invention, therefore, is to provide a simple and compact apparatus for working reclaim rubber.

Another object of the invention is to provide a more effective means of working rubber and like materials.

Another object is to provide means to work and refine rubber while conserving the heat generated in the material during the working operation.

Further objects and advantages will be more readily apparent from the following description of a preferred form of the invention, reference being had to the accompanying drawings in which:

Figure 1 is a longitudinal sectional view of apparatus embodying the invention,

Figure 2 is a transverse sectional view taken in the plane indicated by the line 2—2 of Figure 1, Figure 3 is a longitudinal sectional view taken in the plane indicated by the line 3—3 of Figure 1.

Referring to Figure 1, a cantilever shaft 9 is mounted for rotational movement in the aligned bores 10, 11 and 12 of fixed cylindrical housing sections 13, 14 and 15. Housing sections 13 and 15 are removably secured to member 14 by threaded bosses 16 and 17 respectively in a manner to bring the bores of each housing to axial alignment.

A substantial length of the shaft 9 extends rearwardly from the housing 1 and is connected to conventional support and drive means, not shown, which rotates the shaft.

The forward section of shaft 9 extending through housing is provided with a helical blade 20 adapted to force the rubber to be reclaimed through the bore 10 of section 13. The walls of which are provided with helical threads 21 pitched oppositely to the pitch of helical blade 20. Housing section 13 is also provided with hopper 22 for the introduction of the rubber.

The section of shaft 9 extending through the bore 11 of housing 14 carries rotor member 23 which is divided into two sections of long sweep quadruple flights 24 and 25 respectively, the flutes 24 being staggered radially with respect to the flutes 25 as shown. Rotor 23 tapers outwardly in the forward direction and the bore 11 of housing 14 is correspondingly tapered. This tapered construction of the rotor 23 and the enclosing bore 11 allows for the adjustment of the clearances between the rotor 23 and the bore by adjusting the position of shaft 9 longitudinally within the housing by means of nut 26. Thus, tightening nut 26 draws shaft 9 rearwardly in the housing and reduces the clearance between the tapered rotor flutes 24 and 25 and bore 11. As will be seen later, such adjustment does not affect the clearances between the shaft and the bore 10 and 12 for these bores are cylindrical. Such adjustment may be necessary when continued operation of the device causes the flutes 24 and 25 to wear to a point where the clearance between the flutes and the bore is too great.

The final working section of shaft 9 is equipped with a helical blade 27 adapted to force the rubber under pressure through screens 29 and 30 which are mounted in the strainer head assembly indicated generally at 31.

The strainer head assembly 31 comprises a Y-shaped body having a central bore 32, initially aligned with the bore 12 of housing section 15 which branches into two outwardly tapering diverging bores 33 and 34 associated with the transverse screens 29 and 30. The bores 33 and 34 are provided with plates 35 and 36 which may be used to block their respective bores.

Housing sections 13, 14 and 15 are provided with passages 37, 38 and 39 respectively wherein either heating or cooling fluids may be circulated to control the temperature of the assembly as desired.

In operation, devulcanized rubber is fed continuously into hopper 22. It is immediately engaged by the screw 20 which forces it through the threaded bore 10. In this initial section of the apparatus the rubber is rapidly worked between the blade 20 and the threads 21 to a soft plastic condition. The wiping and kneading action on the rubber in this first working is particularly effective because the threads have a pitch opposite to the blade. In the next stage, the rubber is forced into the smooth bore 12 of housing section 14 where it is repeatedly wiped between the flights 24 and 25 and the wall of the bore in a manner which further refines the rubber. The rubber then passes into the bore 13 of housing section 15 where the helical blades 17 force the rubber through the strainer screens 29 and 30 to remove any dirt and foreign matter contained therein. It will be noted that the material is continuously worked without the undesirable loss of heat which is inherent in the conventional batch processes and that the temperature of the material as it passes through the apparatus may be controlled by circulating heating or cooling fluids through chambers 37, 38 and 39.

The fully refined reclaim will finally leave the apparatus through either of the bores 33 and 34 depending on which of the two stop plates 35 or 36 is in its blocking position. When one of the screens 29 or 30 become too clogged and dirty for practical operation, the corresponding stop plate is closed and the material diverted is through the other strainer while the dirty strainer screen is cleaned. The screens may thus be cleaned without interrupting the operation of the apparatus and consequently production is continuous.

Although the walls of the bore 10 of the first housing section 13 have been provided with helical threads pitched opposite to the helical blade 20, the walls of this bore may be embossed, fluted, corrugated or otherwise provided with a surface which will effectively knead the material being processed.

Although the apparatus has been described for the process of reclaiming rubber it is also adaptable to the processing of other resinous or rubbery material such as the thermoplastic and thermosetting plastics. While a preferred form of apparatus has been described it will be apparent that various modifications and changes may be made without departing from the spirit and scope of the invention, the essential features of which are summarized in the appended claims.

We claim:

1. Apparatus for processing plastic material comprising a shaft, means to drive said shaft at one end, said shaft having a feed end and a delivery end rotatable in the bore of a fixed housing and adapted to masticate said material against the walls of said bore, said shaft comprising helical screws on the feed and delivery ends, said screws being separated by a tapered portion, the wall of said bore adjacent said first screw being helically fluted and having a pitch opposite to the pitch of the cooperating shaft screw, the walls of the bore adjacent said tapered rotor having a smooth surface tapered complementally to said tapered shaft portion, the walls of the bore adjacent said second screw having a smooth cylindrical surface.

2. Apparatus for processing plastic material comprising a shaft having a feed end and a delivery end rotatable in a bore in a fixed housing and adapted to masticate in shear said material between the surface of said shaft and the walls of said bore, the shaft comprising constant pitch helical screws on the feed and delivery ends, said screws separated by a tapered rotor portion faced with flights intermediate said screws, the walls of said bore adjacent said first screw helically fluted and having an opposite pitch thereto, the walls of the bore adjacent said tapered rotor having a smooth surface tapered complementary the taper of said rotor, the walls of the bore adjacent said second screw having a smooth surface, the housing at the delivery end of said shaft provided with a screen transverse the bore whereby said material is freed of foreign material.

3. Apparatus for processing plastic material comprising a shaft having a feed end and a delivery end rotatable in a bore in a fixed housing and adapted to masticate in shear said material between the surface of said shaft and the walls of said bore, the shaft adapted for longitudinal movement and comprising constant pitch helical screws on the feed and delivery ends, said screws separated by a tapered rotor portion faced with quadruple flights in two sections, flights intermediate said screws, the walls of said bore adjacent said first screw helically fluted and having an opposite pitch thereto, the walls of the bore adjacent said tapered rotor having a smooth surface tapered complementary the taper of said rotor, the walls of the bore adjacent said second screw having a smooth surface, the housing at the delivery end of said shaft provided with a screen transverse the bore whereby said material is freed of foreign material.

4. Apparatus for processing plastic material comprising a shaft having a feed end and a delivery end rotatable in a bore in a fixed housing and adapted to masticate in shear said material between the surface of said shaft the walls of said bore, the shaft adapted for longitudinal movement and comprising helical screws on the feed and deilvery ends, said screws separated by a tapered rotor portion faced with flights intermediate said screws, the walls of said bore adjacent said first screw helically fluted and having an opposite pitch thereto, the walls of the bore adjacent said tapered rotor having a smooth surface tapered complementary the taper of said rotor, the walls of the bore adjacent said second screw having a smooth wall, the housing at the delivery end of said shaft provided with a screen transverse the bore whereby said material is freed of foreign material.

5. Apparatus for processing plastic material comprising a shaft having a feed end and a delivery end rotatable in a bore in a fixed housing and adapted to masticate in shear said material between the surface of said shaft and the walls of said bore, the shaft comprising screws on the feed and delivery ends, said screws separated by a rotor portion faced with flights intermediate said screws, the walls of said bore adjacent said first screw having an irregular surface, the walls of the bore adjacent said tapered rotor having a smooth surface, the walls of the bore adjacent said second screw having a smooth surface, the housing at the delivery end of said shaft provided with a screen transverse the bore whereby said material is freed of foreign material.

6. Apparatus for processing plastic material comprising a shaft having a feed end and a delivery end rotatable in a bore in a fixed housing and adapted to masticate in shear said material between the surface of said shaft and the walls of said bore, the shaft adapted for longitudinal movement and comprising constant pitch helical screws on the feed and delivery ends, said screws separated by a tapered rotor portion faced with flights intermediate said screws, the walls of said bore adjacent said first screw helically fluted and having an opposite pitch thereto, the walls of the bore adjacent said tapered rotor having a smooth surface tapered complementary the taper of said rotor, the walls of the bore adjacent said second screw having a smooth wall, the housing at the delivery end of said shaft provided with two openings covered by screens adapted for alternate removal of said material.

7. Apparatus for reclaiming vulcanized rubber comprising a shaft, means to drive said shaft at one end, said shaft being adapted to rotate within the bore of a fixed housing and to advance said rubber through the bore while masticating it in shear against the walls of said bore, said shaft having a first working section comprising a single flight forcing screw, a second section comprising a forwardly enlarged tapered portion and a third working section comprising a single flight forcing screw, said sections being adapted to cooperate respectively with a first bore section having helically grooved walls opposite in pitch to the pitch of said forcing screws, a second bore section comprising smooth tapered walls adapted to receive said tapered shaft portion with a snug fit and a third working section comprising a smooth cylindrical wall surface, means to feed vulcanized rubber continuously into said first bore section and to receive the reclaimed product continuously from the third working section.

References Cited in the file of this patent

UNITED STATES PATENTS

| Number | Name | Date |
|---|---|---|
| 1,935,050 | Gordon | Nov. 14, 1933 |
| 2,411,971 | MacMillin et al. | Dec. 3, 1946 |
| 2,519,014 | Bankey | Aug. 15, 1950 |
| 2,566,854 | Rhodes | Sept. 4, 1951 |
| 2,607,077 | Dulmage | Aug. 19, 1952 |